United States Patent
Wiley et al.

(10) Patent No.: US 6,724,392 B1
(45) Date of Patent: Apr. 20, 2004

(54) SYSTEM AND METHOD FOR PLACING LABELS ON A COMPUTER-GENERATED MAP

(75) Inventors: John-Michael Wiley, Redmond, WA (US); Martin John Sedluk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/260,774

(22) Filed: Mar. 2, 1999

(51) Int. Cl.[7] ............................................. G09G 5/00
(52) U.S. Cl. ......................................... 345/581; 345/587
(58) Field of Search ........................... 345/130, 117, 345/118, 436, 438, 326, 581, 584, 586, 587, 588, 648, 630, 677, 641, 632, 638; 382/276, 293, 298; 701/116, 200, 2.1; 715/512; 703/2

(56) References Cited

U.S. PATENT DOCUMENTS

| | | | | |
|---|---|---|---|---|
| 5,684,940 A | * | 11/1997 | Freeman | 345/438 |
| 5,724,072 A | * | 3/1998 | Freeman | 345/436 |
| 5,798,923 A | * | 8/1998 | Laskowski | 345/117 |
| 5,848,373 A | * | 12/1998 | DeLorme et al. | 701/200 |
| 5,890,808 A | * | 4/1999 | Neff et al. | 382/209 |
| 6,154,219 A | * | 11/2000 | Wiley | 345/433 |
| 6,424,933 B1 | * | 7/2002 | Agrawala et al. | 703/2 |

FOREIGN PATENT DOCUMENTS

JP 04240556 * 1/1991 .......... G01N/21/88

OTHER PUBLICATIONS

Edmondson etal., *A General Cartographic Labeling Algorithm.* Mitsubishi Electric Research Laboratories. Jan. 1996.

Christensen et al., *Labeling Point Features on Maps and Diagrams.* Harvard University Center for Research in Computer Technology. Jun. 1994.

Doerschler et al., *System for Dense–Map Name Placement.* Communications of the ACM, vol.35, No. 1, pp. 70–79, Jan. 1992.

Yoeli, Pinhas. *The Logic of Automated Map Lettering.* pp. 99–108, 1972.

Freeman et al., *On the Problem of Placing Names in a Geographic Map.* pp. 121–140. 1987.

Hirsch, Stephen. *An Algorithm for Automatic Name Placement Around Point Data.* The American Cartographer, vol. 9, No.1 pp. 5–17. 1982.

* cited by examiner

*Primary Examiner*—Matthew C. Bella
*Assistant Examiner*—Wesner Sajous
(74) *Attorney, Agent, or Firm*—King & Spalding LLP

(57) ABSTRACT

A system and method for selecting a cartographically-preferred label position from a plurality of potential label positions for a feature on a computer-generated map. The mechanism analyzes each pixel within each potential label position to determine the presence of a colliding label or a colliding feature, and calculates a total penalty for each potential label position. Then, based on the several total penalties, the mechanism determines which of the potential label positions is the cartographically-preferable label position and places the label in that label position.

18 Claims, 6 Drawing Sheets

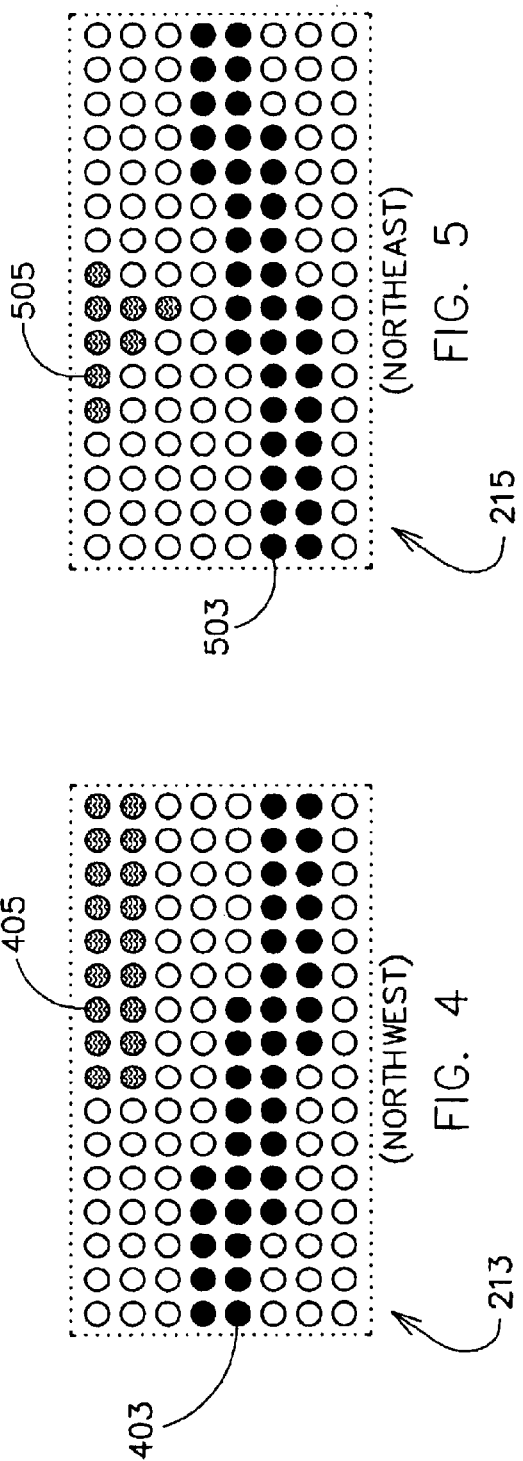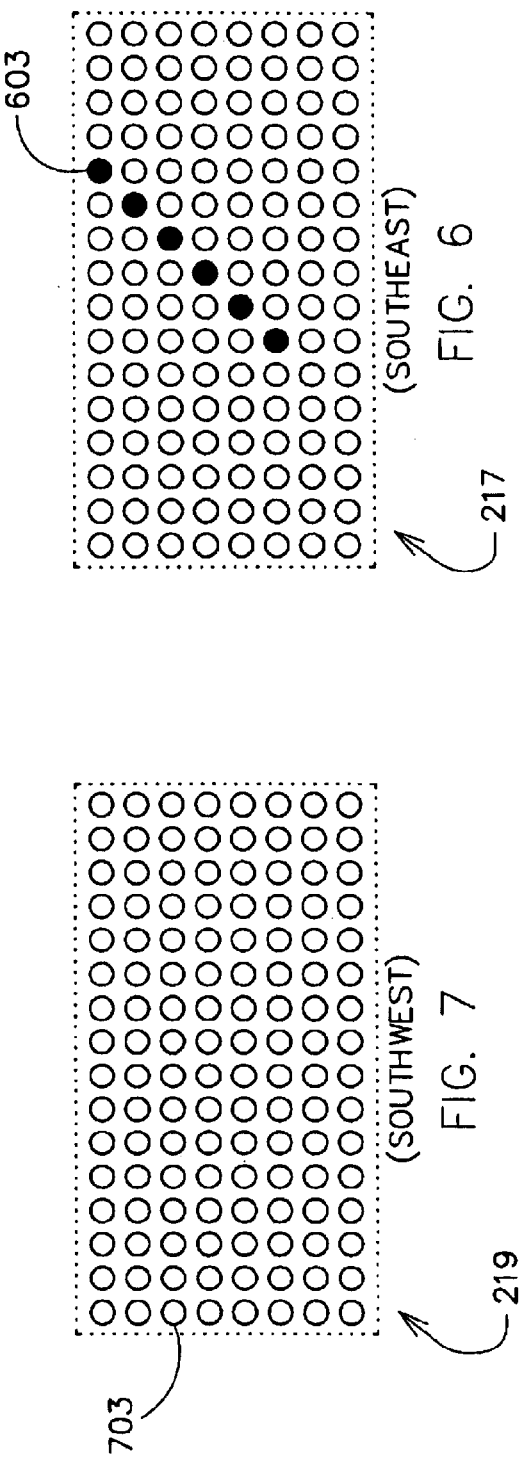

SYSTEM AND METHOD FOR PLACING LABELS ON A COMPUTER-GENERATED MAP

TECHNICAL FIELD

The present invention relates generally to computer software application programs for placing labels on computer generated maps. More particularly, the present invention relates to a mapping program or software module for using display properties of various feature classes to assist in locating a cartographically-preferable label position for a feature on a computer generated map.

BACKGROUND OF THE INVENTION

Computer mapping products are achieving widespread acceptance. To make a computer mapping product usable, labels must be displayed on-screen associated with important features, such as countries, cities, lakes, mountains, rivers, and the like. One problem facing the developers of computer mapping products is how to place labels on the map in a visually appealing or cartographically-preferable manner. Printed map makers spend many hours placing labels in specific locations to maximize the aesthetics of the printed map. Unfortunately, the designers of computerized mapping applications are faced with a different operating environment which creates special problems. First, the displayed map itself may change from moment to moment. A user of the mapping application may alter the displayed view, which may require moving some labels on the screen. The user may also select different features to display on the computer-generated map, a problem alien to the printed-map maker. Accordingly, designers of computer mapping programs strive to develop improved means for placing labels in cartographically-preferable positions on a computer-generated map.

To place a label on a computer-generated map, current mapping technologies typically analyze interferences between a potential label position and a feature displayed on the map (collisions). For instance, before placing a label on the map, potential label positions are first tested to determine if they collide with other features or labels, and then compared to determine the best of the potential label positions. One example of such a collision-analysis technology is described in patent application Ser. No. 08/980,846, filed on Dec. 1, 1997, entitled "SYSTEM AND METHOD FOR OPTIMALLY PLACING LABELS ON A MAP," and assigned to the same assignee as the present application.

One problem with such mapping programs is that they generally fail to determine the degree to which a collision interferes with a potential label position. In other words, current mapping programs do not analyze how much of a potential label position is interfered with by another feature, such as land, water edges, streets, state borders, etc. The result may sometimes be less than aesthetically pleasing.

Thus, current label positioning technologies fail to consider the degree to which a potential label position is interfered. Consequently, a need exists for a system or method for identifying a cartographically-preferable label position for a feature from a plurality of potential label positions for the feature. In addition, the system or method should be capable of determining the degree to which a potential label position is interfered with by another label position or another feature. Moreover, the system or method should be capable of computing a penalty for each potential label position in the plurality of potential label positions based both on the quality and quantity of a collision between the potential label position and another label position or feature.

SUMMARY OF THE INVENTION

The present invention meets the above-described needs by providing a mechanism for selecting a cartographically-preferred label position from a plurality of potential label positions for a feature. The mechanism analyzes each pixel within each potential label position to determine the presence of a colliding feature, and calculates a total penalty for each potential label position. Then, based on the several total penalties, the mechanism determines which of the potential label positions is the cartographically-preferable label position and places the label in that label position.

In accordance with one embodiment of the present invention, each feature or feature class to be displayed on a computer-generated map is assigned a penalty. A feature class is a family of features of the same type. For example, all roads may be in one class, all lakes may be in another class, all rivers may be in a third class, etc. In addition, for the purpose of this discussion, a feature class may include features which are not of the same type, but which share a similar penalty weighting. The penalty may be associated with a desirability that the feature not be obstructed by a label or another feature. The desirability may be based on cartographic conventions well known in the art. In other words, all roads in a road feature class may have the same penalty, all rivers in a river feature class may have another penalty, all lakes in a lake feature class may have a third penalty, etc.

When a map is displayed on-screen by a mapping program, it is generally displayed in color. By assigning a particular color to each feature class, the displayed map is given visual characteristics. In other words, the different colors allow the viewer of the map to distinguish between different features. Accordingly, each feature or feature class is identifiable by a display color.

In this embodiment, the present invention associates each feature class penalty with that feature class' color. Prior to placing labels on the map for any feature requiring a label, the mapping program determines which of each potential label positions for the feature is the most cartographically preferable.

To help determine the most cartographically-preferable label position, the mapping program examines each pixel within each potential label position. Based on the color, the mapping program counts the number of pixels associated with each feature which coincides with the potential label position. For instance, if the first pixel examined is blue, and blue is associated with a "lake" feature class, then the mapping program associates the pixel with the lake feature class and its corresponding penalty. The mapping program tabulates the number of pixels which correspond to each of the possible feature classes. Once it has examined each of the pixels in a potential label position, the mapping program calculates a total penalty for that potential label position, and then repeats the process for the remaining potential label positions. Finally, the mapping program places the label in the label position having the lowest total penalty.

In this manner, the present invention provides the ability for a mapping program to analyze each of a feature's potential label positions to determine a cartographically-preferable label position based both on the occurrence of a collision with another feature, and the severity of the collision with other features. Other aspects, benefits, and uses of the present invention will become apparent to those skilled in the art upon a reading of the following detailed description taken in conjunction with the attached drawings.

BRIEF DESCRIPTION OF THE DRAWINGS

FIGS. 4–7 are graphical representations of the pixels which make up the potential label positions displayed to a screen of a mapping program constructed in accordance with an exemplary embodiment of the present invention.

DETAILED DESCRIPTION OF THE INVENTION

The present invention is directed to a system and method for selecting a cartographically-preferred label position from a plurality of potential label positions for a feature by analyzing each pixel within each potential label position to determine the presence of a colliding label or a colliding feature, and calculating a total penalty for each potential label position. The present invention may be embodied in a mapping program, such as the "Encarta Virtual Globe" mapping program owned and licensed by the Microsoft Corporation of Redmond, Wash.

Exemplary Operating Environment

Figure 1:
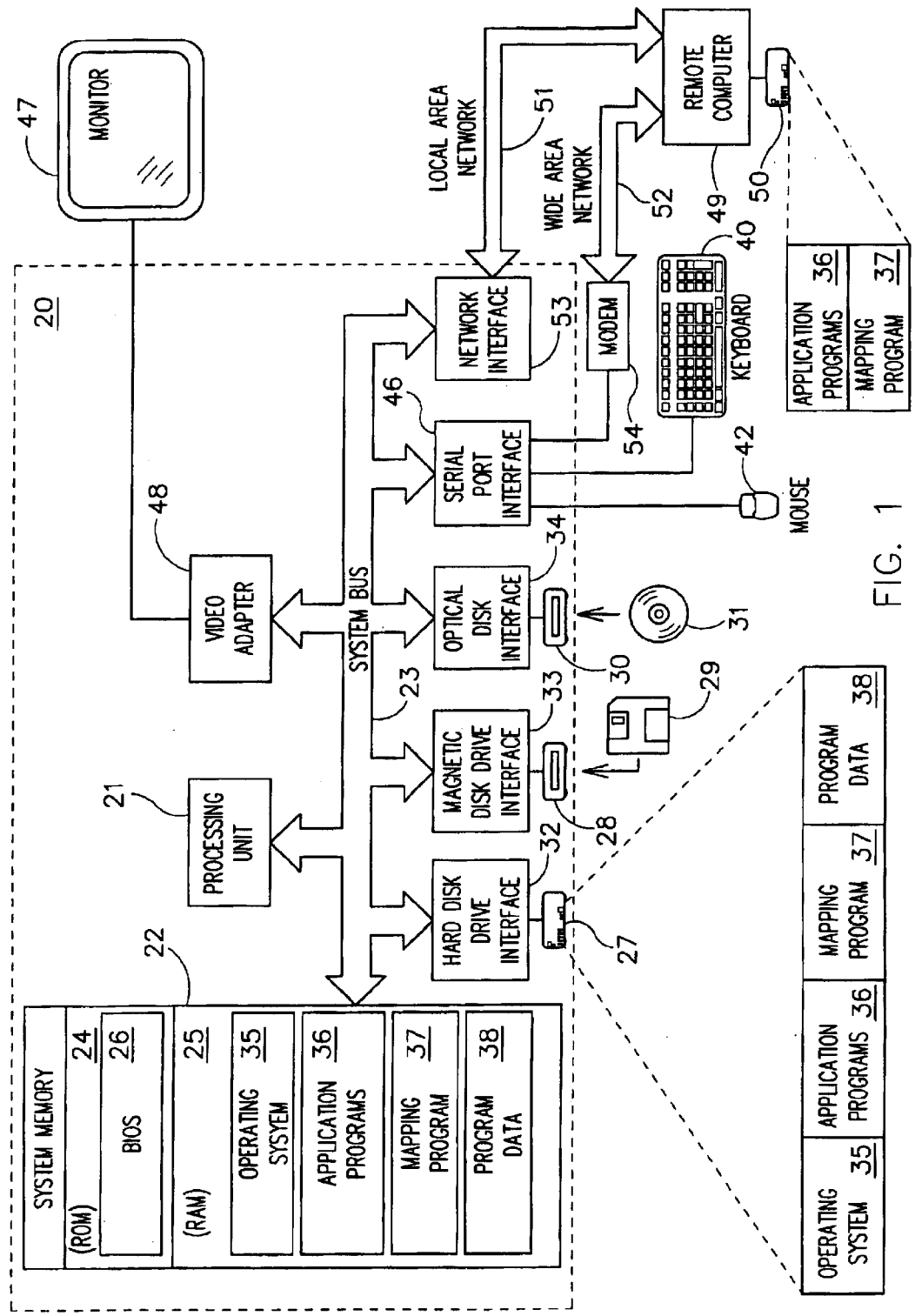
FIG. 1 is a block diagram of a conventional personal computer that provides a portion of the operating environment for an exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the rives and RAM 25, including an operating system 35, one or more plication programs 36, a computer mapping program 37 having an embodiment of the present invention, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the emote memory storage device. It will be appreciated that the network connections shown are exemplary and other means of establishing a communications link between the computers may be used.

One Exemplary Embodiment

Figure 2:
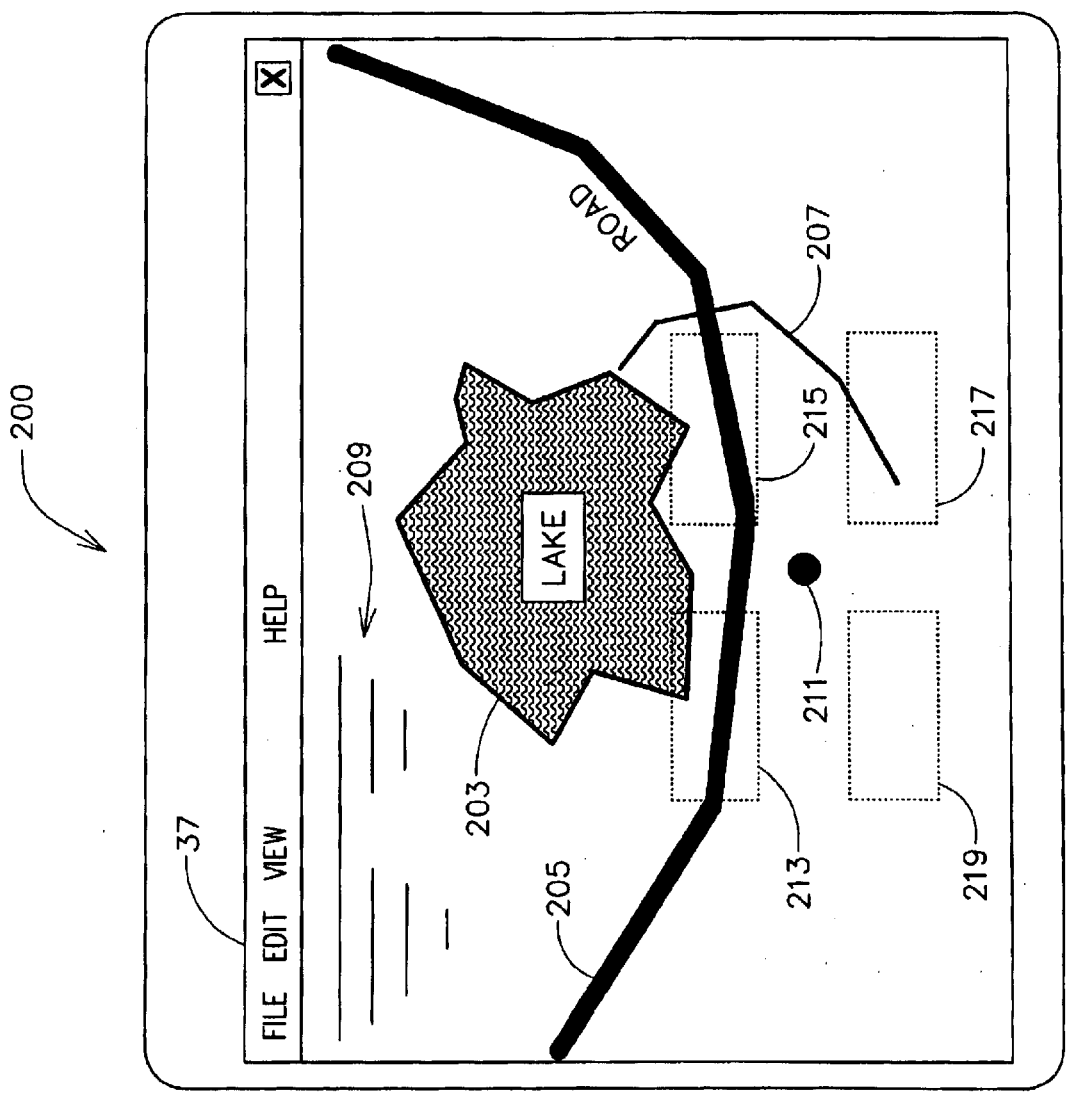
FIG. 2 is a sample screen display presented by a mapping program constructed in accordance with an exemplary embodiment of the present invention.

FIG. 2 depicts a sample screen display 200 presented by the mapping program 37 constructed in accordance with an exemplary embodiment of the present invention. Visible in the display 200 is the mapping program 37 as it presents a sample computer-generated map. On the map are several features such as a lake 203, a road 205, a river 207, a mountain 209, and a city 211. In this example, the city 211 includes four potential label positions: the northwest position 213, the northeast position 215, the southeast position 217, and the southwest position 219. Although each of the features is visible in the display 200, the label for the city 211 has not yet been placed on the map. The mapping program, in accordance with the present invention, first analyzes each of the potential label positions 213, 215, 217, 219 to determine a cartographically-preferred label position.

Those skilled in the art will appreciate that the display 200 is composed of thousands of pixels which each display a single color. Each pixel may be capable of displaying hundreds, thousands, or even millions of different colors. The color of each pixel is generally determined by a binary number which is electronically written to that pixel location. For instance, if each color is represented by an eight-bit binary number, then there are 256 possible colors for that pixel. The computer 20 maintains a listing of the binary number representing the color being displayed by each pixel of the display 200.

Figure 3:
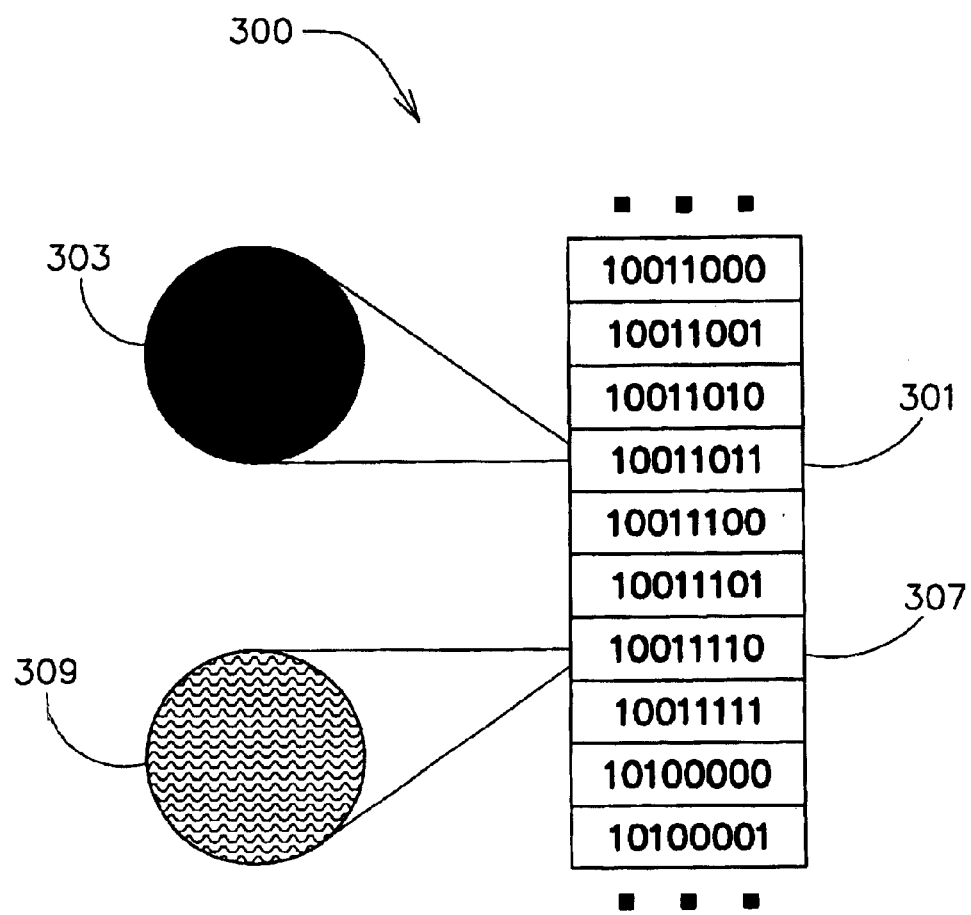
FIG. 3 depicts a table reflecting a representative sample of possible colors which represented by an eight-bit binary value.

FIG. 3 illustrates a table 300 which reflects a representative sample of the possible colors which can be represented by an eight-bit binary value. In this example, when the binary value "10011011" 301 is written to a pixel of the display 200, the pixel radiates the color represented by the darkened circle 303 (which represents black in this example). Likewise, when the binary value "10011110" 307 is written to a pixel of the display 200, the pixel radiates the color represented by the circle 309 containing wavy lines (which represents blue in this example). Those skilled in the art will appreciate that many other combinations of binary numbers and color representations are possible and the disclosed example is merely given to illustrate the concept.

Returning to FIG. 2, the lake 203 is displayed in blue, and the road 205 is displayed in black. In addition, the river 207 may be displayed in a different shade of blue, which requires a different binary value from the table 300 of binary values. In the disclosed embodiment, one feature class, such as roads, may be associated with many different colors, such as orange and red. However, in the disclosed embodiment each color is associated with only one feature class. In that way, each color is associated with only a single penalty.

It can be appreciated that the northwest position 213 collides with both the road 205 and the lake 203 because those two features each occupy a portion of the northwest position 213. Likewise, the northeast position 215 also collides with the road 205 and the lake 203. The southeast position 217 collides with the river 207, and the southwest position 219 does not collide with another feature displayed on the map. In order to select the cartographically-preferred label position, the mapping program 37 analyzes each potential label position 213, 215, 217, 219, as discussed further with respect to FIGS. 4–7.

FIGS. 4–7 are graphical representations of the potential label positions, respectively, for the city 211. Each of FIGS. 4–7 illustrates the pixels which make up the respective label positions displayed to the screen 200. Each of the small circles in FIGS. 4–7, such as pixel 703, represents a single pixel of the display 200. Those skilled in the art will appreciate that FIGS. 4–7 are for simplicity of discussion only, and actual pixels may be much smaller and more numerous than those illustrated.

By comparing FIGS. 4–7 and FIG. 2, it can be appreciated that the darkened pixels, such as pixel 403 and pixel 503, in FIGS. 4 and 5 represent those pixels displaying portions of the road 205. Likewise, the pixels containing wavy lines, such as pixel 405 and 505, in FIGS. 4 and 5 represent those pixels displaying portions of the lake 203. The darkened pixels of FIG. 6 represent those pixels displaying portions of the river 207. Finally, FIG. 7 contains only pixels which are not displaying a color representing another feature (all the pixels display the background color of the map).

To select the cartographically-preferable label position, the mapping program 37 analyzes each of the potential label positions 213, 215, 217, 219 pixel-by-pixel. For instance, the mapping program 37 may begin with the northwest position 213 illustrated in FIG. 4. The mapping program 37 determines the color associated with each pixel contained within the northwest position 213 in any conventional manner, such as by polling the operating system 35. Alternatively, because the mapping program 37 of the disclosed embodiment created the bitmap picture 200 which is displayed, the mapping program 37 may simply inspect the bitmap picture itself for the colors of the significant pixels. It should be understood, that in accordance with the present embodiment, color is used as a pixel characteristic with which to compare pixels. However, other characteristics may be used to distinguish pixels by storing on a pixel-by-pixel basis information representing the map features or feature classes (e.g., roads, rivers, etc.) associated with a given pixel.

The mapping program 37 tabulates the number of pixels displaying each color corresponding to a feature or label. For instance, in FIG. 4, there are 18 blue pixels (represented by the wavy lines). The blue pixels represent the lake 203, and the lake 203 has an associated penalty. Accordingly, the mapping program 37 is able to assign a penalty to the northwest position 213 based on the number of pixels which collide with the lake 203. In addition, the northwest position 213 includes 36 black pixels, which represent the road 205. The road 205 also has an associated penalty which may be much higher than the penalty for the lake 203.

To calculate a total penalty, the mapping program may calculate the percentage of the label position with which a collision exists. For instance, in the above example, the northwest position 213 is composed of 128 pixels, of which 18 pixels, or about 14 percent, are blue. The mapping program 37 may apply a predetermined penalty to a label position which exceeds 10 percent blue pixels. In addition, 36 of the pixels in the northwest position 213, or about 28 percent, are black. The mapping program 37 may apply another predetermined penalty to a label position which exceeds 25 percent black. By adding those two penalties, a total penalty may be calculated for the northwest label position 213.

In contrast, of the 128 pixels in the northeast position 215, 36 pixels are black, or about 28 percent. This percentage is the same as that for the northwest location 213. However, 8 of the pixels are blue, or about 6 percent. Therefore, the penalty associated with having more than 10 percent blue pixels will not apply to the northeast position 215 (although a lesser penalty may apply). Accordingly, although the northeast position 215 includes the same penalty as the northwest position 213 for containing an equal number of black pixels, such as pixel 403 and pixel 503, the penalty for blue pixels, such as pixel 405 and pixel 505, is less because fewer of the pixels in the northeast position 215 collide. As a result, the mapping program 37 is better able to analyze the potential label positions 213, 215, 217, and 219 based not only on the occurrence of a collision, but also on the severity of the collision. This advantage overcomes the identified shortcomings of the existing technologies.

Continuing with the disclosed example, the southeast position 217, illustrated in FIG. 6, does not include any blue pixels, but includes 6 black pixels, such as pixel 603, corresponding to a portion of the river 207. Consequently, a predetermined penalty for having roughly 5 percent black pixels is applied to the southeast position 217. And finally, the southwest position 219 does not include any colored pixels. Consequently, there is no penalty associated with that label position.

In accordance with the present embodiment of the present invention, if an already drawn label is present in a potential label position, such as position 219, that potential position is dropped from consideration, and the final label position is selected from the remaining potential label positions 213, 215, 217. Alternatively, if a potential label position has been selected for placement of a label for another map feature, a penalty system may be used to select between competing label positions.

As an alternative to the "percentage-exceeded" method discussed above, the total penalty for a potential label position may be calculated by multiplying a predetermined penalty associated with each pixel color (feature class) by the number of pixels reflecting that color within the potential label position. In that manner, each pixel may have an individual "pixel penalty," and the total penalty for the label position may be the sum of the individual pixel penalties. These and other alternative methods of calculating the total penalty for each label position will become apparent to those skilled in the art.

Another Exemplary Embodiment

Figure 8A:
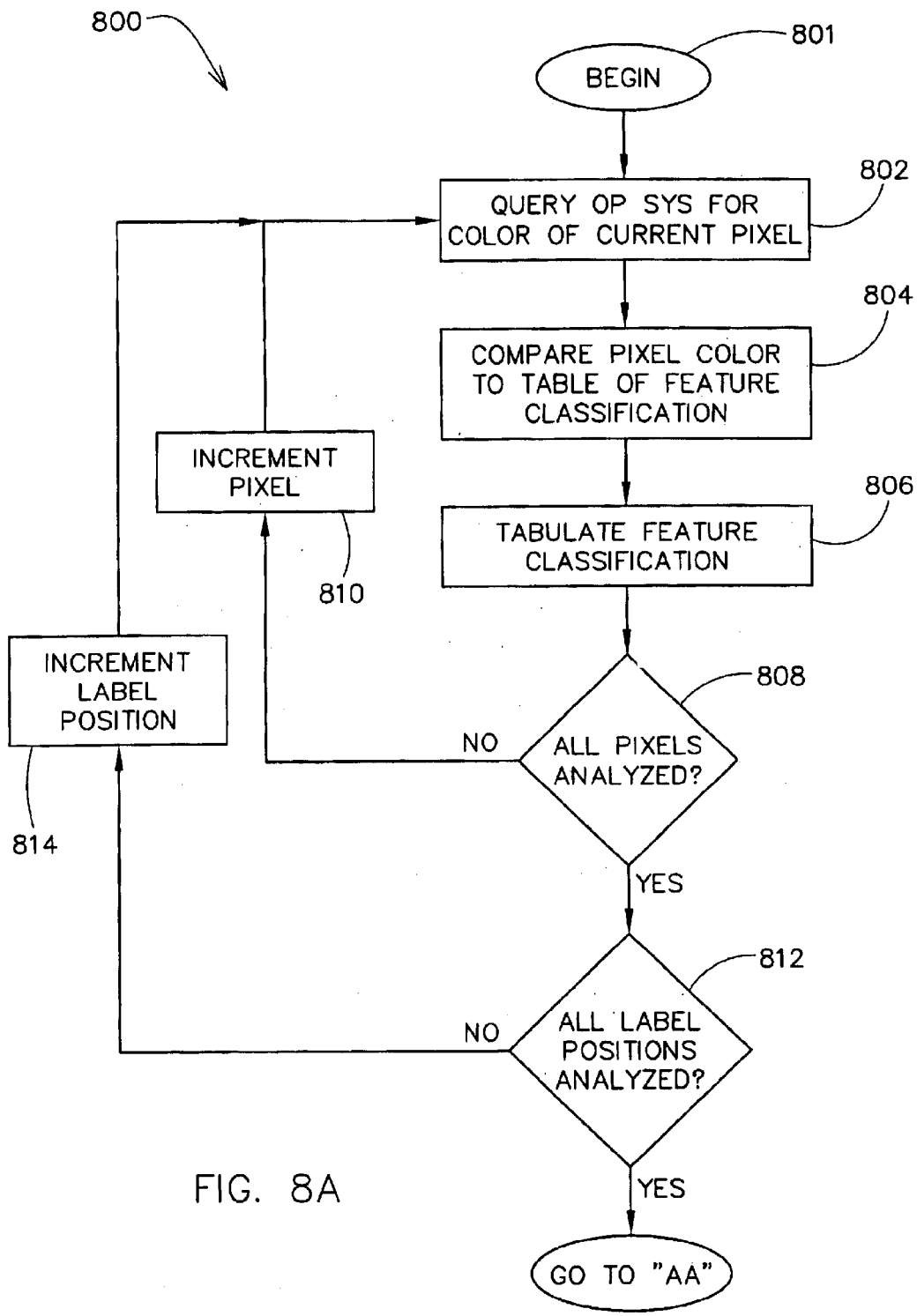
FIGS. 8A and 8B are logical flow diagrams illustrating steps performed by one embodiment of the present invention to select a cartographically-preferred label position.
Figure 8B:
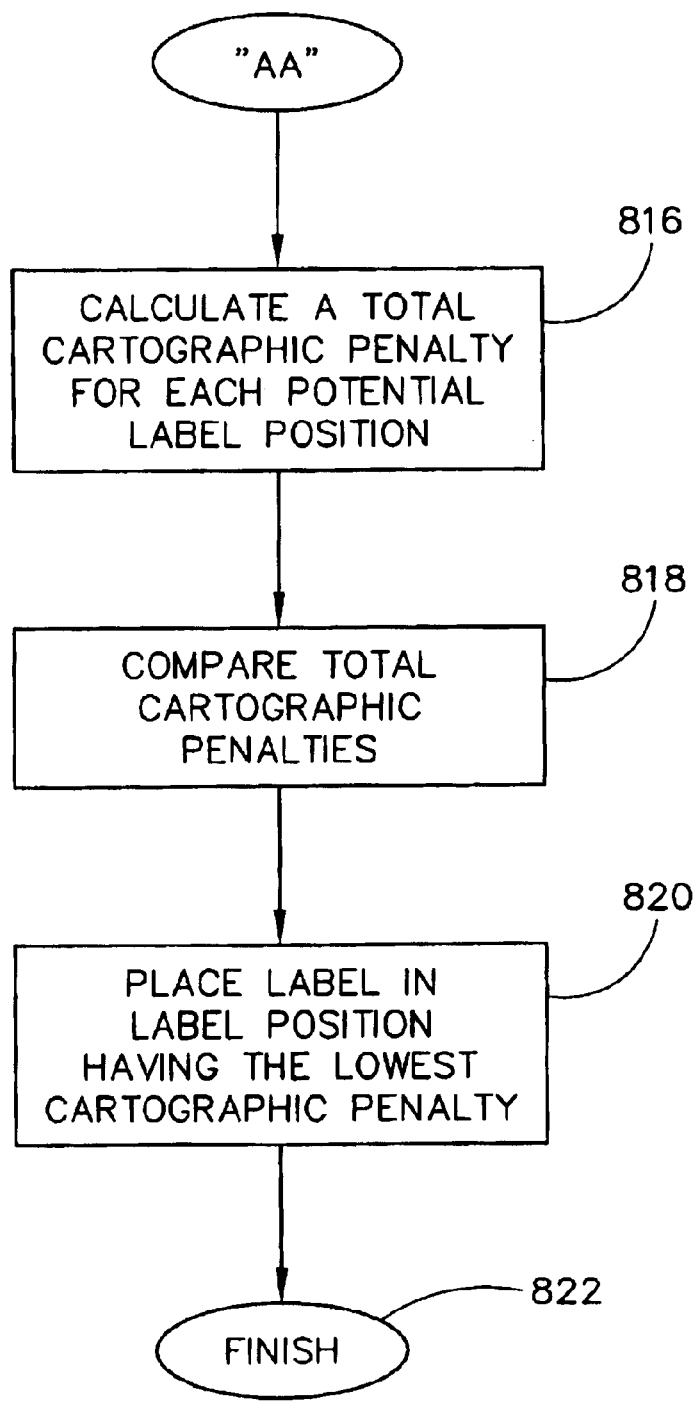

FIG. 8 is a flow chart depicting steps performed by a process 800 for implementing one embodiment of the present invention. The process 800 begins at step 801 where the mapping program 37 is rendering a map to a display, and selecting a preferred label position for a feature from several potential label positions. The process 800 proceeds to step 802, where the selection begins.

At step 802, the mapping program 37 begins to analyze a potential label position for a feature. The potential label position may be the northwest position 213 illustrated in FIGS. 2 and 4. The process 800 begins by selecting a current pixel to analyze, which may be any pixel within the label position. At step 802, the mapping program 37 queries the operating system 35 for the color being displayed by the current pixel. The operating system 35 may return a binary number which indicates the color, or it may return some other indicator of the color, such as a text string, etc. The process 800 then proceeds to step 804.

At step 804, the mapping program 37 compares the current pixel color to a table of feature classes. The table associates each feature class with the display colors for that feature class. The table allows the mapping program 37 to discern which feature class occupies the pixel. The process 800 then proceeds to step 806.

At step 806, the mapping program increments a counter related to the feature class identified at step 804. The counter allows the mapping program to tabulate the number of pixels which are occupied by each feature class. For instance, if the current pixel is occupied by a lake feature class, the mapping program would increment a counter associated with the lake feature class, thereby tabulating the number of pixels occupied by the lake feature class. The process 800 then continues to step 808.

At step 808, a determination is made whether the current pixel is the last pixel in the label position. A negative determination follows the "No" branch to step 810.

At step 810, the pixel being analyzed is incremented to the next pixel in the label position, and the process 800 returns to step 802 and repeats for the next pixel.

If at step 808 a positive determination was made that the current pixel is the last pixel in the label position, then the process 800 is complete respecting the current label position. In that case, the process 800 continues to step 812.

At step 812, a determination is made whether the current label position is the last potential label position for the current feature of interest. A negative determination follows the "No" branch to step 814.

At step 814, the label position being analyzed is incremented to the next potential label position for the current feature of interest. For example, if the current label position is the northwest position 213, at step 814 the label position may be incremented to the northeast position 215. The process 800 then returns to step 802 and repeats for the next label position.

If at step 812 a positive determination was made that the current label position is the last potential label position for the current feature of interest, then the process is complete respecting the current feature of interest. In that case, the process 800 continues to step 816.

At step 816, a total penalty is calculated for each of the potential label positions. As discussed above, the total penalty may be based on the percentage of each feature class which occupies the label position. For instance, a certain penalty may be applied to a label position which is occupied by more than 25 percent of a particular feature class, such as a road. Likewise, another penalty may attach to a label position which is occupied by more than 10 percent of another feature class, such as a lake or mountain. The particular penalties associated with various percentages of various feature classes are a design consideration, as will be apparent to those of ordinary skill in the art. The process 800 then continues to step 818.

At step 818, the total penalties of the potential label positions are compared to determine the potential label position having the lowest total penalty. Then, at step 820, a label for the current feature of interest is placed in the label position having the lowest total penalty. The process 800 then terminates at step 822.

Other embodiments of the present invention will become readily apparent to those skilled in the art from a review of this detailed description in conjunction with the attached drawings. For instance, there are many alternative means for calculating the total penalty for a label position once the pixel colors are associated with feature classes. For instance, a single "pixel penalty" may be associated with each feature class, and the number of pixels reflecting that feature class may merely be added to achieve a total penalty for each feature class. Then, the total penalties for each feature class may be added to achieve a total label position penalty.

Those skilled in the art will also appreciate that the penalties calculated in the above examples may be in addition to many other penalties which may also be included in the consideration of the cartographically-preferable label position. For instance, each of the potential label positions for a feature may be assigned a penalty based on the label position's relation to the feature. In other words, the northwest position 213 may be preferable to the southwest position 219, which in turn is preferable to the southeast position 217. The penalties and preferences enabled by embodiments of the present invention may be used in lieu of or in addition to penalties calculated through other means, including through existing technologies.

Moreover, the use of pixel color is not intended to be limiting of the present invention, and alternatives to pixel color will become apparent to those skilled in the art. For instance, an alternative embodiment could keep track of features or feature classes drawn to each pixel using an alternative method. For example, a separate piece of memory could be used to store an identifier for the last feature class written to each pixel. Rather than associating the feature's penalty with the pixel color, the penalty could be associated with the identifier. In another alternative, the present invention could take advantage of unused display bits associated with a particular pixel. For instance, a 32-bit color value could be used for each pixel. Three of the bytes could be used for a Red/Green/Blue color palette ("RGB"), while the last byte could be used to identify a feature class. Because the typical computer system uses only the RGB values, one color could have 255 different feature classes associated with it.

These are but examples of many alternative embodiments which will become readily apparent upon a close examination of the teachings of the present invention. From a reading of the above description of the disclosed embodiments, other modifications and variations thereto may become apparent to those skilled in the art. Therefore, the scope of the present invention is to be limited only by the following claims.

What is claimed is:

1. A computer-readable medium having computer-executable instructions for determining a preferred label position from a plurality of label positions, which when executed perform steps comprising:
   (a) associating a characteristic of a pixel with a feature class, the feature class being associated with features to be displayed on a computer-generated map;
   (b) analyzing each label position within the plurality of label positions to determine a number of pixels within each label position which bear the characteristic; and
   (c) calculating a penalty for each label position of the plurality of label positions based on a percentage of pixels within each label position which bear the characteristic,
   (d) collaring each of the label positions in the plurality of label positions to determine a preferred label position, the preferred label having a lowest penalty; and
   (e) placing a label in the preferred label position, wherein some overlap may occur between the label and a feature in the preferred label position.

2. The computer-readable medium of claim 1, wherein the characteristic is color.

3. The computer-readable medium of claim 1, wherein the step of calculating the penalty further comprises:
   determining if the number of pixels which bear the characteristic exceeds a preconfigured percentage of a total number of pixels within each label position.

4. The computer-readable medium of claim 1, wherein the step of analyzing each label position further comprises:
   counting the number of pixels within each label position which bear the characteristic; and
   counting a second number of pixels within each label position which bear a second characteristic, the second characteristic being associated with a second feature class.

5. The computer-readable medium of claim 4, wherein the step of calculating the penalty for each label position further comprises:
   calculating a first penalty associated with the number of pixels within each label position which bear the characteristic;
   calculating a second penalty associated with the second number of pixels within each label position which bear the second characteristic; and
   combining the first penalty and the second penalty for a total penalty associated with each label position.

6. The computer-readable medium of claim 5, wherein the step of calculating the first penalty further comprises:
   determining if the number of pixels which bear the characteristic exceeds a preconfigured percentage of a total number of pixels within each label position; and
   wherein the step of calculating the second penalty further comprises:
      determining if the second number of pixels which bear the second characteristic exceeds a second preconfigured percentage of a total number of pixels within each label position.

7. The computer-readable medium of claim 1, wherein the step of calculating the penalty further comprises:
   multiplying the number of pixels within each label position which bear the characteristic by a first per-pixel penalty associated with the feature class; and
   wherein the step of calculating the second penalty further 5 comprises:
      multiplying the number of pixels within each label position which bear the characteristic by a first per-pixel penalty associated with the feature class.

8. The computer-readable medium of claim 5, wherein the step of calculating the first penalty flier comprises:
   multiplying the number of pixels within each label position which bear the characteristic by a per-pixel penalty associated with the feature class; and
   wherein the step of calculating the second penalty further comprises:
      multiplying the number of pixels within each label position which bear the second characteristic by a second per-pixel penalty associated with a second feature class.

9. In a computer system, a computer-implemented method for selecting a preferred label position from a plurality of potential label positions for display on a computer-generated map, comprising the steps of:
   (a) associating a display color with a feature class, a penalty being associated with the feature class;
   (b) determining a pixel color displayed by a pixel within a first label position within the plurality of potential label positions;
   (c) in response to the pixel color matching the display color associated with the feature class, counting the pixel toward a penalty for the first label position, wherein counting the pixel towards a penalty comprises associating the penalty with the pixel;
   (d) repeating steps (b) and (c) for each pixel within the first label position to calculate a total penalty for the first label position; and
   (e) repeating steps (b), (c), and (d) for each potential label position in the plurality of label positions to determine a preferred label position, the preferred label position having a lowest calculated total penalty.

10. The computer-implemented method of claim 9, further comprising the step of:
    displaying a label in the preferred label position, the label being associated with a feature displayed on the computer-generated map.

11. The computer-implemented method of claim 9, wherein the step of counting the pixel toward a penalty further comprises:
    incrementing a counter associated with the feature class, the counter being operative to tabulate a number of pixels within the first label position which display the display color.

12. The computer-implemented method of claim 11, wherein a penalty is associated with the feature class, and the step of repeating steps (b) and (c) further comprises associating the penalty with the number of pixels within the first label position which display the display color.

13. The computer-implemented method of claim 9, wherein the feature class comprises a plurality of types of features which may be displayed on a computer-generated map, and the feature class.

14. A computer-readable medium having computer-executable instructions for determining a preferred label position from a plurality of label positions, which when executed perform steps comprising:

(a) associating a display color with a first feature class;

(b) associating a penalty with the first feature class;

(c) examining each pixel in a plurality of pixels within a first label position in the plurality of label positions to determine a pixel color for each pixel;

(d) determining a number of pixels in the plurality of pixels for which the pixel color is the display color;

(e) based on the number of pixels in the plurality of pixels for which the pixel color is the display color, assigning a total penalty to the first label position;

(f) repeating steps (c) through (e) for each of the label positions in the plurality of label positions; and (g) picking one label position from step (f) as the preferred label position, the one label position having the lowest total penalty.

15. The computer-readable medium of claim 14, wherein the step of determining the number of pixels in the plurality of pixels further comprises:

determining a second number of pixels within the plurality of pixels for which the pixel color is a second display color, the second display color being associated with a second feature class.

16. The computer-readable medium of claim 15, wherein the step of assigning the total penalty to the first label position further comprises:

calculating a first penalty associated with the number of pixels within the first label position for which the pixels color is the display color; and calculating a second penalty associated with the second number of pixels within the first label position for which the pixel color is the second display color; and combining the first penalty and the second penalty for a total penalty associated with the first label position.

17. The computer-readable medium of claim 16, wherein the step of calculating the first penalty further comprises:

determining if the number of pixels for which the pixel color is the display color exceeds a preconfigured percentage of a total number of pixels within the first label position; and wherein the step of calculating the second penalty further comprises:

determining if the second number of pixels for which the pixel color is the second display color exceeds a second preconfigured percentage of a total number of pixels within the first label position.

18. The computer-readable medium of claim 14, further comprising computer-executable steps for displaying a label in the preferred label position.

* * * * *